US010156358B2

(12) United States Patent
Savary et al.

(10) Patent No.: US 10,156,358 B2
(45) Date of Patent: Dec. 18, 2018

(54) COMBUSTION CHAMBER WALL

(75) Inventors: Nicolas Savary, Jurancon (FR); Claude Berat, Igon (FR); Guy Grienche, Coarraze (FR); Patrick Berteau, Arbus (FR); Hubert Pascal Verdier, Nay (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 687 days.

(21) Appl. No.: 14/239,977

(22) PCT Filed: Aug. 22, 2012

(86) PCT No.: PCT/FR2012/051917
§ 371 (c)(1),
(2), (4) Date: Feb. 20, 2014

(87) PCT Pub. No.: WO2013/030492
PCT Pub. Date: Mar. 7, 2013

(65) Prior Publication Data
US 2014/0208763 A1    Jul. 31, 2014

(30) Foreign Application Priority Data

Aug. 26, 2011   (FR) ..................... 11 57574

(51) Int. Cl.
*F23R 3/00*      (2006.01)
*F23R 3/06*      (2006.01)
*F23R 3/52*      (2006.01)

(52) U.S. Cl.
CPC ............ *F23R 3/002* (2013.01); *F23R 3/06* (2013.01); *F23R 3/52* (2013.01);
(Continued)

(58) Field of Classification Search
CPC .... F23R 3/002; F23R 3/06; F23R 3/52; F23R 2900/03041; F23R 2900/03042; Y02T 50/675
See application file for complete search history.

(56) References Cited

U.S. PATENT DOCUMENTS 7,942,006 B2    5/2011   Critchley et al.
2007/0169484 A1    7/2007   Schumacher et al.
(Continued)

FOREIGN PATENT DOCUMENTS

EP    1 811 231    7/2007

OTHER PUBLICATIONS

International Search Report dated Oct. 10, 2012 in PCT/FR12/051917 Filed Aug. 22, 2012.
(Continued)

*Primary Examiner* — John C Hong
(74) *Attorney, Agent, or Firm* — Oblon, McClelland, Maier & Neustadt, L.L.P.

(57) ABSTRACT

An annular wall for a combustion chamber of a turbomachine. The wall presents a hot side and a cold side and includes at least one primary hole for enabling a first flow of air flowing on the cold side of the wall to penetrate to the hot side of the wall to feed combustion of fuel inside the combustion chamber, and together with a plurality of cooling holes, each having a diameter no greater than 1 mm, to enable a second flow of air flowing on the cold side of the wall to penetrate to the hot side of the wall to cool the hot side of the wall. The plurality of cooling holes can also dilute combustion gas resulting from the combustion by using the flow of air penetrating to the hot side of the wall through the cooling holes.

13 Claims, 2 Drawing Sheets

(52) U.S. Cl.
CPC ............... *F23R 2900/03041* (2013.01); *F23R 2900/03042* (2013.01); *Y02T 50/675* (2013.01)

(56) References Cited

U.S. PATENT DOCUMENTS

2009/0199563 A1  8/2009  Chen
2011/0023495 A1  2/2011  Bronson et al.

OTHER PUBLICATIONS

Office Action dated Feb. 16, 2016 in Japanese Patent Application No. 2014-526534 (submitting English language translation only).
Canadian Office Action for Canadian Patent Application No. 2,843,690; dated May 17, 2018.

COMBUSTION CHAMBER WALL

BACKGROUND OF THE INVENTION

The present invention relates to the field of combustion chambers for turbomachines, and in particular to the annular walls of turbomachine combustion chambers, which walls have a cold side and a hot side.

The term "turbomachine" is used in the present context to mean a machine that converts heat energy of a working fluid into mechanical energy by said working fluid expanding in a turbine. In the description below, the terms "upstream" and "downstream" are defined relative to the normal flow direction of the working fluid through the turbomachine.

In particular, the present invention relates to so-called "internal combustion" turbomachines in which the working fluid of the turbine includes at least some of the products of the combustion that has delivered this heat energy to the working fluid. Such turbomachines include in particular gas turbines, turbojets, turboprops, and turboshaft engines. Typically, such internal combustion turbomachines include, upstream from the turbine, a combustion chamber in which a fuel is mixed with the working fluid, typically air, and is burnt. Thus, the chemical energy contained in the fuel is converted into heat energy in the combustion chamber, thereby heating the working fluid, and it is the heat energy of the working fluid that is subsequently converted into mechanical energy in the turbine. Typically, such a turbomachine also includes, upstream from the combustion chamber, a compressor that is driven by a rotary shaft that is common to at least one turbine stage in order to compress the air before combustion.

In such a turbomachine, the combustion chamber typically has at least one annular wall with holes for enabling the air that flows on the cold side of the wall to penetrate to the hot side of the wall. Such a wall extends in the flow direction of the working fluid between an end wall of the combustion chamber, where fuel injectors are normally situated, and a combustion gas outlet. The combustion chamber is typically situated inside a gas generator casing, which casing is in communication with the compressor in order to receive the air that has been compressed therein.

In such a combustion chamber, the flow of air through the holes performs several functions. In a first zone referred to as a "primary" zone, close to the end wall of the chamber and thus to the injectors, the wall includes at least one "primary" hole that serves mainly for feeding air for the combustion reaction with the fuel that is injected by the injectors. Nevertheless, the air entering into the combustion chamber through holes situated in a second zone that is further downstream, referred to as the "dilution" zone, serves mainly to dilute the combustion gas, so as to reduce its temperature at the outlet from the combustion chamber, thereby limiting the thermal stresses on the turbine downstream from the combustion chamber.

Nevertheless, in order to increase the efficiency of the thermodynamic cycle of the turbomachine, the trend is to increase the temperature in the combustion chamber more and more. This leads to considerable thermal stresses also occurring on the walls of the shell of the combustion chamber. In order to cool these walls, they may present a large number of cooling holes of small diameter, normally no greater than 1 millimeter (mm). Air entering into the combustion chamber through these cooling holes forms a relatively cold film on the hot side of each wall, thereby protecting the material of the walls from the combustion heat.

In the dilution zone of prior art combustion chambers, there are nevertheless to be found both dilution holes of large diameter, normally greater than 1 mm, for diluting the combustion gas, and also cooling holes of small diameter, no greater than 1 mm, for cooling the walls of the combustion chamber, since the person skilled in the art is of the opinion that it is necessary to have jets of air that can be produced only by holes of large diameter in order to enable them to penetrate deeply into the flow in the combustion chamber so as to obtain better mixing downstream between the dilution air and the combustion gas. Nevertheless, that gives rise to other drawbacks. In particular, those dilution air jets can give rise to large amounts of non-uniformity in the temperature inside the combustion chamber. Unfortunately, for environmental reasons and for combustion efficiency reasons, it is important to ensure that temperature is distributed as uniformly as possible within the combustion chamber. Any temperature peaks therein can give rise to nitrous oxides being formed, whereas fuel can remain unburnt in zones of lower temperature.

OBJECT AND SUMMARY OF THE INVENTION

The present invention thus relates to an annular wall for a combustion chamber of a turbomachine, the wall having a cold side and a hot side, said wall being provided with at least one primary hole for enabling a first flow of air flowing on the cold side of the wall to penetrate to the hot side of the wall to feed the combustion of fuel inside the combustion chamber, and a plurality of cooling holes, each having a diameter no greater than 1 mm in order to enable a second flow of air flowing on the cold side of the wall to penetrate to the hot side of the wall to cool the hot side of the wall.

An object of the present invention is to make temperature distribution within the combustion chamber more uniform, while increasing the thermodynamic cycle efficiency of the turbomachine. To do this, in at least one embodiment of an annular wall for a combustion chamber of a turbomachine of the invention, the plurality of cooling holes is also suitable for diluting the combustion gas resulting from said combustion by using the flow of air penetrating to the hot side of the wall through the cooling holes. Contrary to the prejudice of persons skilled in the art, it has been found that supplying air to such orifices of small diameter suffices not only to cool the walls of the combustion chamber, but also to achieve effective mixing of the combustion gas with the air delivered via these orifices of small diameter, thereby achieving effective dilution of the combustion gas.

In particular, in a second aspect of the invention, in such a combustion chamber, said cooling holes may present not less than 50% of a total surface area for passing air through the wall, and more specifically, at least 97% of a total surface area for passing air through the wall downstream from said at least one primary hole. It is thus possible to omit large quantities of orifices of large diameter for diluting the combustion gas, thus not only assisting in avoiding non-uniformities in the flow in the combustion chamber, but also making it easier to fabricate the dilution zone of the combustion chamber.

In a third aspect, in order to improve mixing between the combustion gas and the air delivered via the cooling holes, each hole of a plurality of said cooling holes is oriented along an axis that in projection on the wall presents an angle $\theta$ of not less than 45° relative to the direction of a central axis of the wall. In particular, said angle $\theta$ may lie in the range 85° to 95°. Thus, the air injected into the combustion chamber through the cooling holes follows a helical path, thereby lengthening its transit time in the combustion chamber and thickening the film of relatively cool air adjacent to the hot side of the wall, thus benefiting not only the cooling of the wall, but also the mixing of the combustion gas with the air in this thicker film.

In a fourth aspect, also for improving mixing of the combustion gas with the air introduced via the cooling holes, each hole of a plurality of said cooling holes is oriented along an axis presenting an angle β relative to the wall, the angle β being no greater than 45°, and preferably no greater than 30°. This ensures that the film of relatively cool air adjacent to the hot side of the wall is stable.

Nevertheless, in a fifth aspect, and also for the purpose of stabilizing the film of cool air, said angle β is not less than 15°, and preferably not less than 20°.

The present invention also provides a combustion chamber of a turbomachine including an inner wall and an outer wall that are coaxial. The inner wall and/or the outer wall may be annular walls constituting an embodiment of the invention, thus including a plurality of cooling holes, each having a diameter no greater than 1 mm in order to enable a second flow of air flowing on the cold side of the wall to penetrate to the hot side of the wall to cool the hot side of the wall, and also ensuring the dilution of the combustion gas resulting from said combustion by using the flow of air penetrating to the hot side of the wall through the cooling holes. Nevertheless, the combustion chamber may have a shape other than this annular shape. For example, it may be formed by a plurality of such annular walls with different central axes arranged around a central axis of the turbomachine in order to form a plurality of separate flame pipes.

The present invention also provides a turbomachine, such as a gas turbine, a turbojet, a turboprop, or a turboshaft engine, in particular for an aviation application, the engine including a combustion chamber with at least one annular wall including a plurality of cooling holes, each having a diameter no greater than 1 mm in order to enable a second flow of air flowing on the cold side of the wall to penetrate to the hot side of the wall to cool the hot side of the wall, and also ensuring the dilution of the combustion gas resulting from said combustion by using the flow of air penetrating to the hot side of the wall through the cooling holes.

The present invention also provides a method of diluting combustion gas in a combustion chamber of a turbomachine, said combustion chamber having at least one annular wall with a cold side and a hot side, and being provided with at least one primary hole for enabling a first flow of air flowing on the cold side of the wall to penetrate to the hot side of the wall to feed the combustion of fuel inside the combustion chamber, and a plurality of cooling holes, each having a diameter no greater than 1 mm in order to enable a second flow of air flowing on the cold side of the wall to penetrate to the hot side of the wall to cool the hot side of the wall, the method being characterized in that the flow of air penetrating to the hot side of the wall also serves to dilute the combustion gas.

BRIEF DESCRIPTION OF THE DRAWINGS

The invention can be well understood and its advantages appear better on reading the following detailed description of an embodiment given by way of non-limiting example. The description refers to the accompanying drawings, in which.

DETAILED DESCRIPTION OF THE INVENTION

Figure 1:
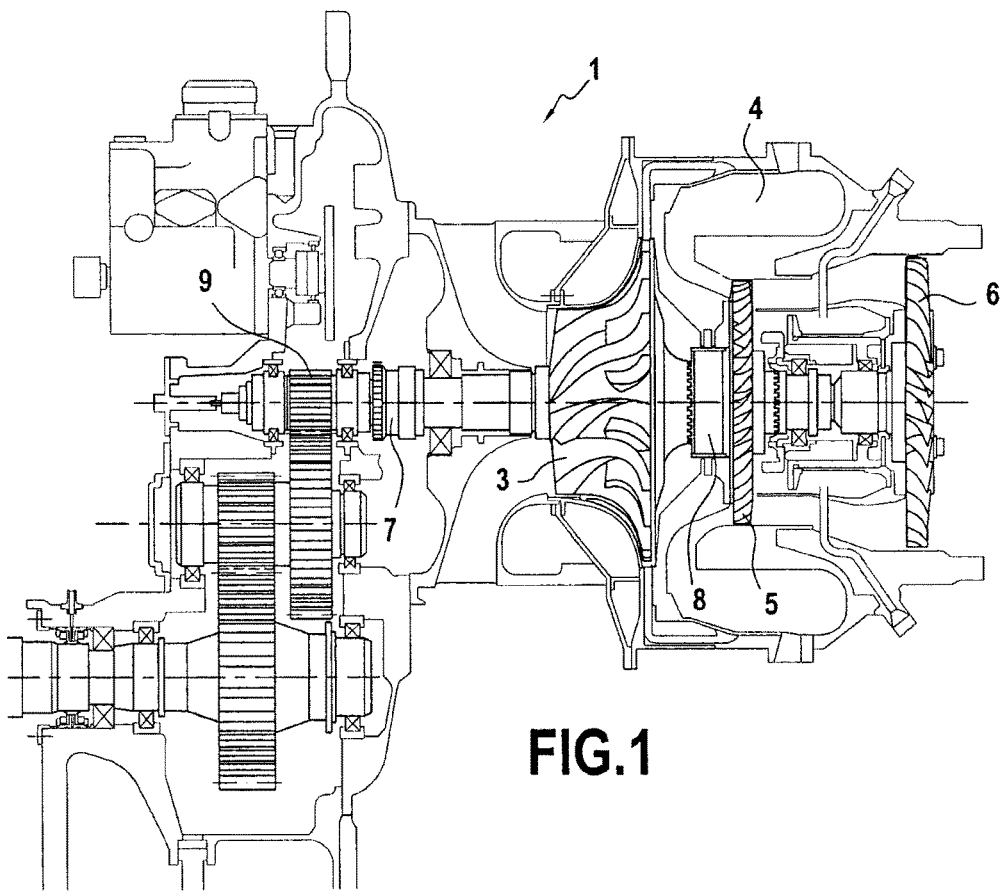
FIG. 1 is a diagrammatic longitudinal section of a turbomachine.

A turbomachine, and more particularly, a turboshaft engine 1, is shown diagrammatically by way of explanation in FIG. 1. In the flow direction of a working fluid, this engine 1 comprises: a centrifugal compressor 3; an annular combustion chamber 4; a first axial turbine 5; and a second axial turbine 6. In addition, the engine 1 also has a first rotary shaft 7 and a second rotary shaft 8 coaxial to the first rotary shaft 7.

The second rotary shaft 8 connects the centrifugal compressor 3 to the first axial turbine 5 so that the expansion of the working fluid in the first axial turbine 5 downstream from the combustion chamber 4 serves to drive the compressor 3 upstream from the combustion chamber 4. The first rotary shaft 7 connects the second axial turbine 6 to a power take-off 9 located downstream and/or upstream from the engine, in such a manner that the subsequent expansion of the working fluid in the second axial turbine 6 downstream from the first axial turbine 5 serves to drive the power take-off 9.

Thus, the compression of the working fluid in the centrifugal compressor 3, followed by heating of the working fluid in the combustion chamber 4, and by its expansion in the second axial turbine 6, enables a portion of the heat energy obtained by the combustion in the combustion chamber 4 to be converted into mechanical work that is extracted from the power take-off 9. In the engine shown, the driving fluid is air, with fuel being added thereto and burnt in the combustion chamber 4, which fuel may for example be a hydrocarbon.

Figure 2:
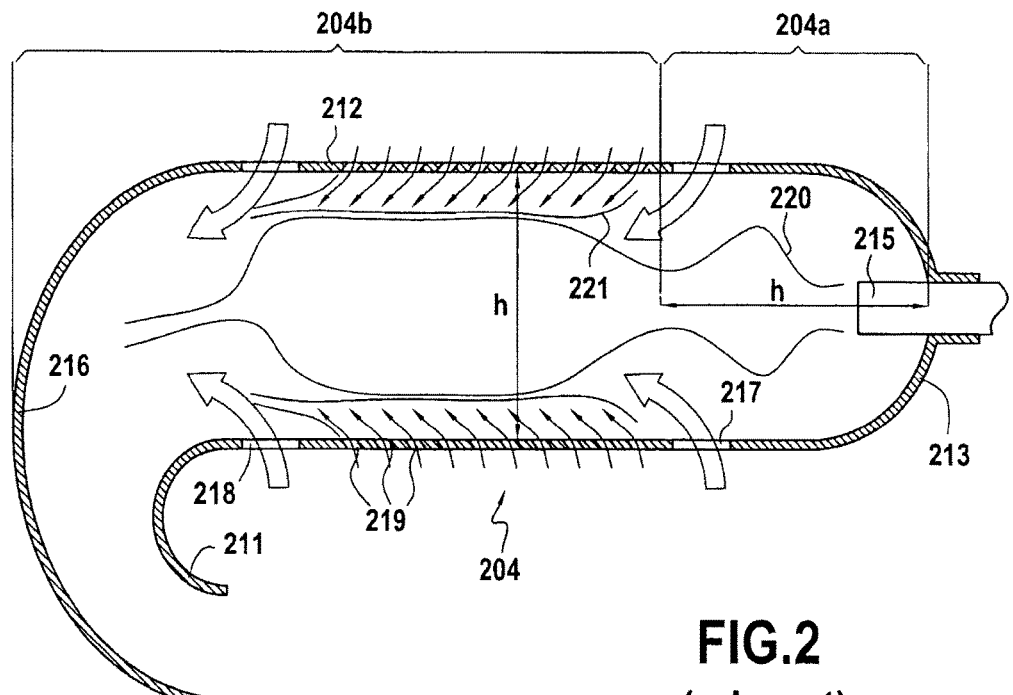
FIG. 2 is a diagrammatic longitudinal section of a prior art combustion chamber.

A prior art combustion chamber 204 is shown in FIG. 2. This combustion chamber 204 comprises an inner wall 211 and an outer wall 212, which walls are annular and coaxial, extending from an end wall 213 where the two walls 211 and 212 join together, to a combustion gas outlet. The combustion chamber 204 can be subdivided into a primary zone 204a in which fuel injectors 215 are situated, and a dilution zone 204b that is downstream from the primary zone 204a. In the example shown, the combustion chamber 204 is of the type presenting a bend 216 in order to limit its axial extent. Combustion chambers of this type are particularly widespread in turbomachines having centrifugal compressors, particularly when they are turboshaft engines, as shown in FIG. 1.

The walls 211 and 212 of the combustion chamber 204 present holes of three different types, all three of which are used for passing flows of air from the cold side of the walls 211, 212 outside the combustion chamber 204, to the hot side of the walls 211, 212 inside the combustion chamber 204. Holes of a first type are said to be "primary" holes 217, situated in the primary zone 204a and serving to pass air that is used for feeding the combustion of the fuel injected by the injectors 215. Downstream from these primary holes 217, the walls 211, 212 also have holes of a second type known as "dilution" holes 218, serving to pass air that is used for diluting the combustion gas 220 that results from the combustion of the fuel as injected by the injectors 215 reacting with the air entering via the primary holes 217. The walls 211, 212 also have holes of a third type referred to as "cooling" holes 219, allowing air to pass that is used for cooling the hot side of each of the walls 211, 212. The three types of hole differ in particular in their different sizes. Thus, the primary holes 217, and above all the dilution holes 218 present diameters that are significantly greater than the diameter of the cooling holes 219. Whereas the cooling holes are distributed in large numbers over the surfaces of the walls 211, 212 with each of them having a diameter no greater than 1 mm, the dilution holes 218 have diameters of about 5 mm and more. Thus, when the engine is in operation, the air penetrating to the hot sides of the walls 211, 212 through the cooling holes 219 form a film 221 of relatively cool air that remains adjacent to the walls 211, 212 in order to protect them from the heat of the combustion gas 220, the air penetrating through the dilution holes 218 forming jets 222 that penetrate deeply into the combustion chamber 204 in order to become mixed with the combustion gas 220 in the dilution zone 204b.

Figure 3:
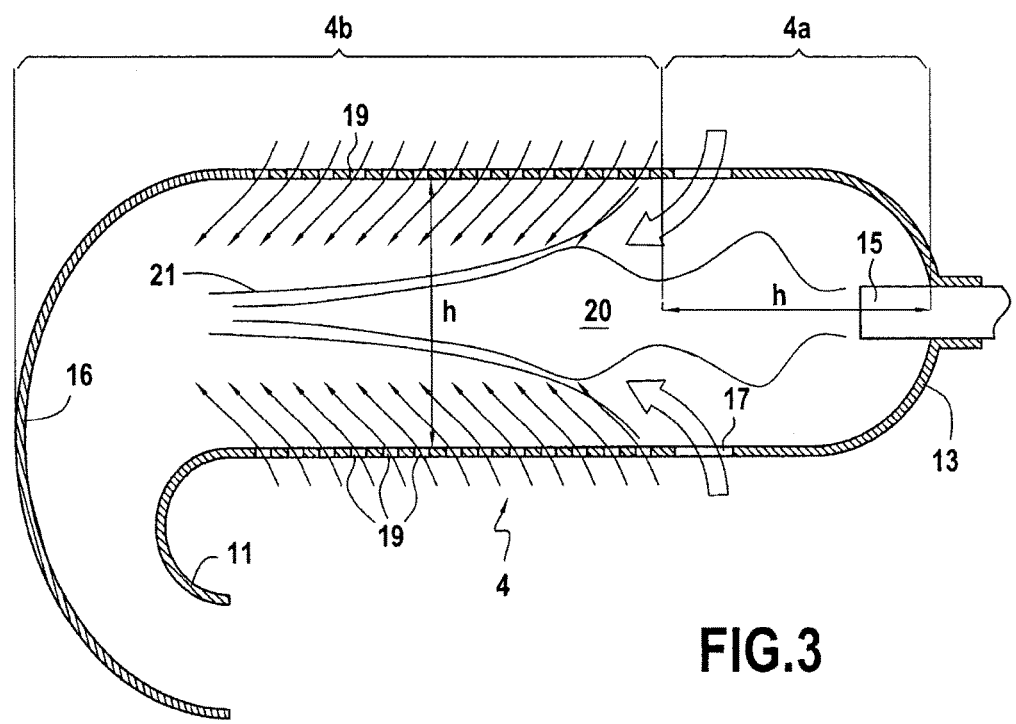
FIG. 3 is a diagrammatic longitudinal section of a combustion chamber in a first embodiment of the invention.

A combustion chamber 4 in an embodiment of the invention is shown in FIG. 3. This combustion chamber 4 also has an inner wall 11 and an outer wall 12 that are annular and coaxial, extending from an end wall 13 where the walls 11 and 12 join together to a combustion gas outlet. The combustion chamber 4 may likewise be subdivided into a primary zone 4a in which fuel injectors 15 are situated, and a dilution zone 4b downstream from the primary zone 4a. In the embodiment shown, the inner and outer walls are spaced apart by a maximum radial distance h, and the depth of the primary zone along the direction of the central axis X of the combustion chamber is equal to said distance h. In the example shown, the combustion chamber 4 is likewise of the type presenting a bend 16 in order to limit its axial extent.

Nevertheless, unlike the prior art combustion chamber 204, this combustion chamber 4 has only two types of hole for passing flows of air from the cold sides of the walls 11, 12 outside the combustion chamber 4 to the hot sides of the walls 11, 12 inside the combustion chamber 4: it has primary holes 17 and cooling holes 19. Thus, downstream from said primary holes 17, and in particular in the dilution zone 4b, the walls 11, 12 present practically no holes for passing air of a diameter greater than 1 mm. Although the walls 11, 12 may present certain other orifices, such as for example holes for endoscopic inspection of the combustion chamber 4, the cooling holes 19 represent at least 50% of a total surface area for passing air through the walls 11, 12 and at least 97% in the dilution zone 4b.

Figure 4B:
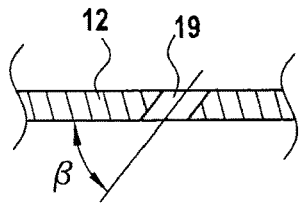
FIG. 4B is a detail view of the same wall, in cross-section on line IVB-IVB.
Figure 4A:
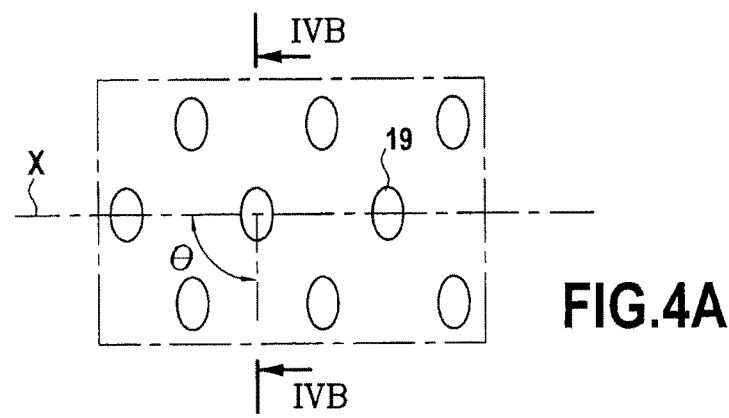
FIG. 4A is a detail view of a wall of the FIG. 3 combustion chamber, in cylindrical projection.

In this combustion chamber 4, the specific dilution holes of greater diameter are absent, so the combustion gas 20 is diluted practically exclusively by the air that penetrates into the combustion chamber 4 through the cooling holes 19, with the film 21 of air adjacent to the walls 11, 12 mixing effectively with the combustion gas 20. In order to facilitate this mixing, in the embodiment shown, the cooling holes 19 are oriented so as to impel the air that penetrates into the combustion chamber 4 through these cooling holes 19 on a trajectory that is helical. Thus, as shown in FIGS. 4A and 4B, in this embodiment, each cooling hole 19 is oriented along an axis that presents an angle β relative to the wall 11, 12, the angle β lying in the range 20° to 30°, and having a projection on the wall that presents an angle β of approximately 90° relative to the direction of the central axis X. The combustion chamber 4 that is shown thus manages to dilute the combustion gas 20 in uniform and effective manner, while omitting specific dilution holes of large diameter, thereby avoiding the drawbacks associated therewith.

Although the present invention is described with reference to a specific embodiment, it is clear that various modifications and changes can be made to this example without going beyond the general scope of the invention as defined by the claims. For example, it is possible to envisage other angles θ and β, and in particular in the ranges θ≥45° and 15°≤β≤45°. In addition, individual characteristics of the various embodiments mentioned may be combined to make additional embodiments. Consequently, the description and the drawings should be considered in an illustrative sense rather than a restrictive sense.

The invention claimed is:

1. An annular wall of a combustion chamber of a turbomachine, the wall having a cold side and a hot side and comprising:
   at least one primary hole for enabling a first flow of air flowing on the cold side of the wall to penetrate to the hot side of the wall to feed combustion of fuel inside the combustion chamber; and
   a plurality of cooling holes, each having a diameter no greater than 1 mm, to enable a second flow of air flowing on the cold side of the wall to penetrate to the hot side of the wall to cool the hot side of the wall,
   wherein the plurality of cooling holes are the only holes in an entirety of the annular wall that dilute combustion gas resulting from the combustion with a flow of air penetrating to the hot side of the wall in a dilution zone.

2. The annular wall according to claim 1, wherein the cooling holes present not less than 50% of a total surface area for passing air through the wall.

3. The annular wall according to claim 1, wherein the cooling holes represent at least 97% of a total surface area for passing air through the wall downstream from the at least one primary hole.

4. The annular wall according to claim 1, wherein each hole of the plurality of the cooling holes is oriented along an axis that in projection on the wall presents an angle θ of not less than 45° relative to a direction of a central axis of the wall.

5. The annular wall according to claim 4, wherein the angle θ is in a range of 85° to 95°.

6. The annular wall according to claim 1, wherein each hole of the plurality of the cooling holes is oriented along an axis presenting an angle β relative to the wall, the angle β being no greater than 45°.

7. The annular wall according to claim 6, wherein the angle β is not less than 15°.

8. The annular wall according to claim 1, wherein the annular wall includes a primary zone and a dilution zone downstream of the primary zone, the at least one primary hole being located in the primary zone, and the plurality of cooling holes being located in the dilution zone.

9. The annular wall according to claim 8, wherein the dilution zone only includes the plurality of cooling holes for passing flows of air from the cold side to the hot side of the annular wall.

10. The annular wall according to claim 1, wherein the at least one primary hole and the plurality of cooling holes are the only holes in the annular wall for passing flows of air from the cold side to the hot side of the annular wall.

11. A combustion chamber for a turbomachine comprising:
   an inner wall and an outer wall that are coaxial,
   the inner wall and/or the outer wall having a cold side and a hot side and comprising at least one primary hole for enabling a first flow of air flowing on the cold side of the wall to penetrate to the hot side of the wall to feed combustion of fuel inside the combustion chamber, and a plurality of cooling holes, each having a diameter no greater than 1 mm to enable a second flow of air flowing on the cold side of the wall to penetrate to the hot side of the wall to cool the hot side of the wall, wherein the plurality of cooling holes are the only holes in an entirety of the annular wall that dilute combustion gas resulting from the combustion with a flow of air penetrating to the hot side of the wall in a dilution zone.

12. A turbomachine comprising:

a combustion chamber including at least one annular wall having a cold side and a hot side and including at least one primary hole for enabling a first flow of air flowing on the cold side of the wall to penetrate to the hot side of the wall to feed combustion of fuel inside the combustion chamber, and a plurality of cooling holes, each having a diameter no greater than 1 mm, to enable a second flow of air flowing on the cold side of the wall to penetrate to the hot side of the wall to cool the hot side of the wall, wherein the plurality of cooling holes are the only holes in an entirety of the annular wall that dilute combustion gas resulting from the combustion with a flow of air penetrating to the hot side of the wall in a dilution zone.

13. A method of diluting combustion gas in a combustion chamber of a turbomachine, the combustion chamber including at least one annular wall having a cold side and a hot side, the method comprising:

enabling, via at least one primary hole in the annular wall, a first flow of air flowing on the cold side of the wall to penetrate to the hot side of the wall to feed combustion of fuel inside the combustion chamber; and enabling, via a plurality of cooling holes in the annular wall, each of the cooling holes having a diameter no greater than 1 mm, a second flow of air flowing on the cold side of the wall to penetrate to the hot side of the wall to cool the hot side of the wall, wherein the second flow of air penetrating to the hot side of the wall is the only flow of air in an entirety of the annular wall that serves to dilute the combustion gas in a dilution zone.

\* \* \* \* \*